United States Patent
Misra

(10) Patent No.: US 11,657,100 B2
(45) Date of Patent: May 23, 2023

(54) COGNITIVELY RENDERED EVENT TIMELINE DISPLAY

(71) Applicant: Kyndryl, Inc., New York, NY (US)

(72) Inventor: Samit Baran Misra, Kolkata (IN)

(73) Assignee: Kyndryl, Inc., New York, NY (US)

( * ) Notice: Subject to any disclaimer, the term of this patent is extended or adjusted under 35 U.S.C. 154(b) by 91 days.

(21) Appl. No.: 17/083,351

(22) Filed: Oct. 29, 2020

(65) Prior Publication Data
US 2022/0138256 A1    May 5, 2022

(51) Int. Cl.
| | |
|---|---|
| G06F 16/90 | (2019.01) |
| G06F 17/40 | (2006.01) |
| G06F 16/906 | (2019.01) |
| G06F 16/909 | (2019.01) |
| G06F 3/04815 | (2022.01) |
| G06F 9/54 | (2006.01) |
| G06F 16/908 | (2019.01) |
| G06F 3/00 | (2006.01) |
| G06F 9/50 | (2006.01) |

(52) U.S. Cl.
CPC ........ *G06F 16/906* (2019.01); *G06F 3/04815* (2013.01); *G06F 9/542* (2013.01); *G06F 16/908* (2019.01); *G06F 16/909* (2019.01); *G06F 17/40* (2013.01)

(58) Field of Classification Search
CPC ..... G06F 16/906; G06F 16/908; G06F 16/909
See application file for complete search history.

(56) References Cited

U.S. PATENT DOCUMENTS

| | | | | |
|---|---|---|---|---|
| 9,002,069 | B2* | 4/2015 | Codella | G06F 16/285 |
| | | | | 709/219 |
| 10,311,074 | B1* | 6/2019 | Beard | G06F 16/2455 |
| 2010/0146436 | A1 | 6/2010 | Jakobson | |
| 2014/0129559 | A1* | 5/2014 | Estes | G06Q 10/10 |
| | | | | 707/737 |
| 2015/0355790 | A1* | 12/2015 | O'Mahony | G06F 3/0482 |
| | | | | 715/771 |
| 2017/0017699 | A1 | 1/2017 | Venugopalan | |
| 2018/0286099 | A1* | 10/2018 | Kozloski | G06F 3/011 |

(Continued)

OTHER PUBLICATIONS

Krecklau et al., "Procedural Interpolation of Historical City Maps", EUROGRAPHICS 2012, vol. 31 (2012), No. 2, © 2012 The Author(s), © 2012 The Author(s), © The Eurographics Association and Blackwell Publishing Ltd.,10 pages.

(Continued)

*Primary Examiner* — Kristopher Andersen
(74) *Attorney, Agent, or Firm* — Erik Swanson, Esq.; Kevin P. Radigan, Esq.; Heslin Rothenberg Farley & Mesiti P.C.

(57) ABSTRACT

Embodiments of the present invention provide methods, computer program products, and systems. Embodiments of the present invention can be used to determine a level of significance of an event in a database of events based on context. Embodiments of the present invention can, in response to the determined level of significance of the event reaching a threshold value for significance, generate a visual representation of the event in the database of events. Embodiments of the present invention can also be used to integrate the generated visual representation of the event into a user display.

20 Claims, 11 Drawing Sheets

(56) References Cited

U.S. PATENT DOCUMENTS

2019/0371026 A1    12/2019   Cervelli

OTHER PUBLICATIONS

Earley-Spadoni, Tiffany, "Spatial History, Deep Mapping and Digital Storytelling: Archaeology's Future Imagined Through an Engagement with the Digital Humanities", Journal of Archaeological Science 84 (2017) 92-102, © 2017 Elsevier Ltd., 9 pages, <http://dx.doi.org/10.1016/j.jas.2017.05.003>.

Mell et al., "The NIST Definition of Cloud Computing", Recommendations of the National Institute of Standards and Technology, NIST Special Publication 800-145, Sep. 2011, 7 pages.

* cited by examiner

| Primary Elements and High Level Functional Modules | | Ref |
|---|---|---|
| T1 T2 T3 T4 T5 T6 T7 T8 T9 T1 T1 T1 T1 T1 T1 T1 T1 T1 T2 T2 T2 T2 T2 T2 T2 T2 T2 T3 T3 T3 T3 | Time Span Array (Tn, n=integer) | 100.TS |
| A A A A A A A A A A A A A A A A A A A A A A A A A A A A A | Cognitive Area Aggregation (Aa) with Manual Override configurable, A= LatitudeLongitude | |
| | Tn-Aa Map = TimeSpec Major Unit (TS unit) | |
| | Eye Span Array (ESn, n=whole numbers) | |
| | ESn-Tn-Aa (ESn-TS) Map = TimeSpec Minor Unit (tsm unit) | 200.tsm |
| E E E E E E E E E E E E E E E E E E E E E E E E E E E E E | Event wise Cognitive Association of Degree of Unusuality (eDOU) Factorization | 300.eDOU |
| E E E E E E E E E E E E E E E E E E E E E E E E E E E E E | Area Aggregation (Weather) 'Aaw' Point Weather Asset Element, Area Aggregation (X2N) 'AaX' Point Sensor data Element | |
| E E E E E E E E E E E E E E E E E E E E E E E E E E E E E | Weather Sentiment Analyzer | 330.WS |
| E E E E E E E E E E E E E E E E E E E E E E E E E E E E E | RSU - X2N Stream Analyzer | 350.X2N |
| E E E E E E E E E E E E E E E E E E E E E E E E E E E E E | Cognitive Event Discritization Engine | 400.CED |
| E E E E E E E E E E E E E E E E E E E E E E E E E E E E E | Discretized Event wise Time Break Assignment Instantiation | |
| E E E E E E E E E E E E E E E E E E E E E E E E E E E E E | Event-Area-Time EAT Instance Tagging | |
| E E E E E E E E E E E E E E E E E E E E E E E E E E E E E | EAT Significance Knowledge Engine | 500.SKE |
| E E E E E E E E E E E E E E E E E E E E E E E E E E E E E | AI rendering of EAT tagged Events | |
| E E E E E E E E E E E E E E E E E E E E E E E E E E E E E | TimeSpec TimeZone Interactive Event Display | 600.WorldBook |

FIG. 7

COGNITIVELY RENDERED EVENT TIMELINE DISPLAY

BACKGROUND

The present invention relates generally to the mapping services and augmented display systems, and more particularly to creating a cognitive rendering that displays an event.

A web mapping service can typically offer satellite imagery, aerial photography, street maps, 360° interactive panoramic views of streets (Street View), real-time traffic conditions, and route planning for traveling by foot, car, bicycle and air (in beta), or public transportation. In some instances, mapping services can include crowdsourced contributions. In general, mapping services can offer a "top-down" or bird's-eye view and can include high-resolution imagery of cities that is collected by aerial photography taken from aircraft flying. Most other imagery is from satellites or 3 d Video Stereo streams, coupled with Fish-eye Video sensors for panoramic streams, or matrix Lidar video images on continuous basis across the world. Typically, satellite imagery is updated on a regular basis. For constellation wide continuous videography images, Astronomical Telescopic cameras stationed on observatories or mounted on satellites and continuous images captured by the astronomical missions Virtual reality (VR) typically refers to a simulated experience that can be similar to or completely different from the real world. Applications of virtual reality can include entertainment and educational purposes. Other, distinct types of VR style technology include augmented reality and mixed reality. A person using virtual reality equipment is able to look around the artificial world, move around in it, and interact with virtual features or items. The effect is commonly created by VR headsets consisting of a head-mounted display with a small screen in front of the eyes but can also be created through specially designed rooms with multiple large screens. Virtual reality typically incorporates auditory and video feedback but may also allow other types of sensory and force feedback through haptic technology.

Augmented reality (AR) generally refers to an interactive experience of a real-world environment where the objects that reside in the real world are enhanced by computer-generated perceptual information, sometimes across multiple sensory modalities, including visual, auditory, haptic, somatosensory and olfactory. AR can be defined as a system that fulfills three basic features: a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one.

SUMMARY

Embodiments of the present invention provide computer-implemented methods, computer program products and systems. In one embodiment of the present invention, a computer-implemented method is provided for determining a level of significance of an event in a database of events based on context; in response to the determined level of significance of the event reaching a threshold value for significance, generating a visual representation of the event in the database of events; and integrating the generated visual representation of the event into a user display.

BRIEF DESCRIPTION OF THE DRAWINGS

FIG. 7 is a sample data element representation, in accordance with an embodiment of the present invention;

DETAILED DESCRIPTION

Figure 1:
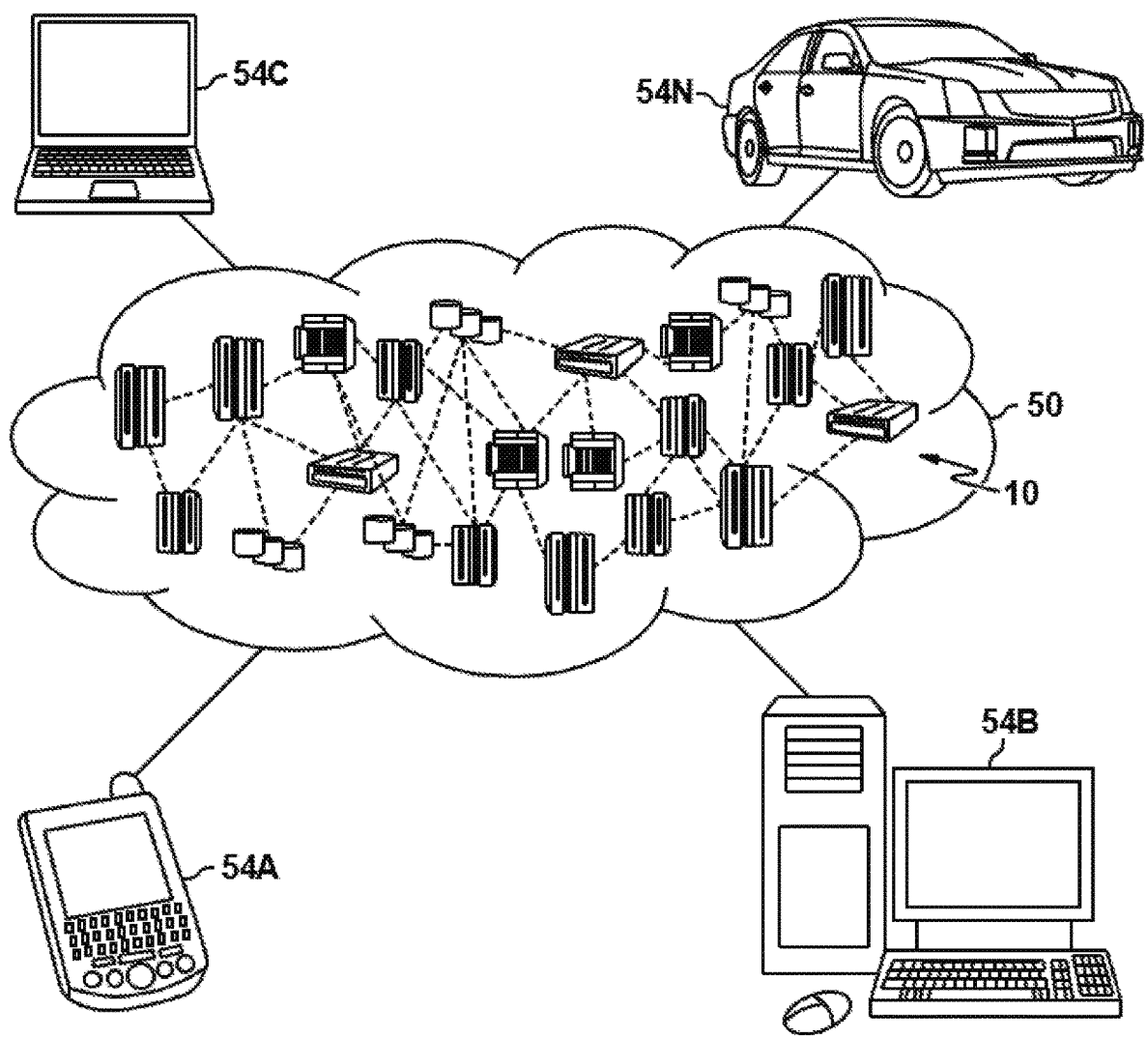
FIG. 1 depicts a cloud computing environment, in accordance with an embodiment of the present invention.

Embodiments of the present invention recognize deficiencies mapping systems. Specifically, embodiments of the present invention recognize that mapping services typically lack comprehensive ways to display events.

In this embodiment, an event can refer to one or more series of actions performed or participated by one or more users. For example, an event can include a concert, a parade, a party, a speech, etc. Series of data captured and communicated by various sensors may constitute an event. For example, likely vehicle fault alert data or any performance related data communicated from a moving autonomous vehicle by the vehicular device to the remote automotive maintenance center can be considered an event. The remote Automotive maintenance center fixing the fault remotely and communicating back to the vehicle or vehicular device is also considered an event. Severe weather or turbulence data captured by the weather assets like phased array radar and upper air weather sensors and the corresponding sentiment data recorded for a weather forecast made or ground earthquake sensor data also are some examples of other events. An event can have historical significance such as a manned mission to space or personal significance to a user. Typical ways to document an event include a user taking one or more audio, picture, and video recordings from several sources.

However, there is no wholistic way to review the captured moments from a wholistic, beginning to end viewpoint that is immerses a user within the event. Embodiments of the present invention recognize the deficiencies of documenting an event and provide solutions for displaying a wholistic viewpoint that a user can reexperience. Specifically, embodiments of the present invention can be used to build a database of events comprising media associated with each event, classify each events based on importance, and generate a display that can be integrated in augmented reality and virtual reality devices and allow a user to interact with components of the display. In some embodiments of the present invention improve mapping systems by integrating a display that can be overlaid on an existing map that allows a user to interact with components in the event. The proposed design of the solution this embodiment provides is agnostic of the technology changes and evolution and outputs of this solution is designed to keep improving with the improving quality of event data inputs. In this way, a user can interact with the generated display and relive the event by viewing multiple viewpoint and interacting with one or more components in the generated display, as discussed in greater detail later in this Specification.

Embodiments of the present invention can enable a user to "slide back" in time to mentally connect with real life historical events occurring from constellations down to a neighboring bus stop. In some embodiments, the present invention can allow for reviewing any video/imagery or sensor recordable machine/man to man/machine events. Embodiments of the present invention provide for a novel, artificial intelligence driven Significance Tagged Cognitive Aggregation of real-life Logical Event Units (LEUs, i.e., periods of time associated with an event or actions depicted within an event) across domains on Time Series. In one embodiment, Event Significance Metering process (e.g., cognitively determining a significance with an event) and Claimed Significance (e.g., user tagged events that indicate a significance) override fulfills the need for real life missing real life un-augmented evidences for varied investigation or any referencing. In another embodiment, the present invention also makes available significantly improved and rich real-life event data, including video records, Massive IoT, Weather Sensors data, 5G Dedicated Network Slice massive IoT data, X2N data, nG RSU data set logically packetized as real life Logical Event units (LEUs) complementing existing temporal visualization tools or platforms for easier and faster analysis and decisions and research. In one embodiment, the weather asset LEU deviation module of this invention can integrate with weather agency systems and help weather analysts generate a weather forecast sentiment learning gradient by matching up with historical sentiment analysis recorded by weather agencies. In another embodiment, this invention makes possible the comparison for example but not limited to, the historical performance of one or more autonomous vehicle engine and the corresponding quality of remote maintenance services completed as part of the cognitive association of nG RSU Sensor Stream module of this invention.

In general, services provided by embodiments of the present invention can offer astronomical view, "top-down" or bird's-eye view or real life close view and can include high-resolution imagery of cities and closeups of points of interest that is collected by aerial photography taken from aircraft flying or stationed objects or mounted on aerial unmanned vehicles like drones in such a manner that continuous streams of videography images are made available. Most other imagery is from satellites, or 3 d Video Stereo streams, coupled with Fish-eye Video sensors for panoramic streams, or matrix LIDAR video images on continuous basis across the world. Typically, satellite imagery is updated on a regular basis. For constellation wide continuous videography images, astronomical telescopic cameras stationed on observatories or mounted on satellites and continuous images captured by the astronomical missions are fed as event stream to the Timeline program 110. In another embodiment, for weather sentiment learning gradient LEU module of the Timeline program, event data are captured from weather asset collection sensors like Phased Array Radar data/Surface/Upper Air/Lightening Sensors etc. In another embodiment, for IoT events captured over 5G Road Side Units (RSU) or nG IoT event data are collected from Massive IoT as are deployed including but not limited to the autonomous vehicular devices and accessible over 5G or nG dedicated Network slice from several but not limited to the configured 3GPP or related Telecom small cells.

Timeline program offers Real life 2D/3D/nD imagery, video stereo or matrix LIDAR video events, satellite imagery or astronomical telescopic videography, or imagery captured including but not limited to various 5G/nG/IoT/massive IoT/weather asset sensor data captured in real life. Embodiments of the present invention recognize that Virtual Reality or Simulations or Animations are completely different from real world or anything not happened or occurred in real life is processed by the solution provided herein. The inputs and outputs of embodiments of the present invention generate visual representations of real-life occurrences. Some amount of AR (Augmented reality) may be adopted while cognitive rendering of the knowledge aspect functions of embodiments of the present invention such that facts of the life or actual occurrence is not distorted. Embodiments of the present invention can be integrated with AR/VR Headgear or any computer or handheld device connected to internet and capable of projecting the outputs of the solution provided by embodiments of this present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
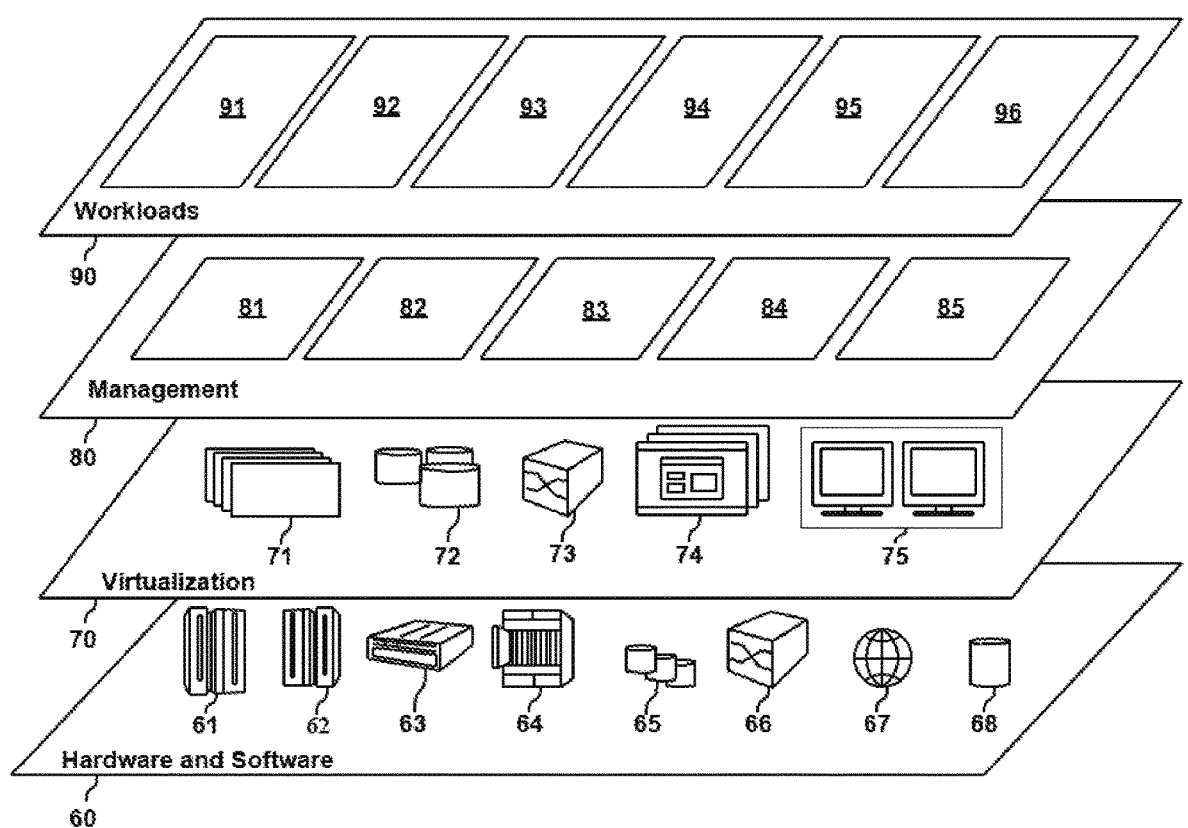
FIG. 2 depicts abstraction model layers, in accordance with an embodiment of the present invention

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enterprise application 96. Some example embodiments of the present invention will be described in the following paragraphs.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 8.

Client computing device 102 is a digital device associated with a user and includes application 104. Application 104 communicates with server computer 108 to access Timeline program 110 (e.g., using TCP/IP) to access user information. Application 104 can further communicate with Timeline program 110 to transmit instructions to record event data, classify recorded events based on context, generate a display of an organized sequence event, and subsequently display the generated display as discussed in greater detail with regard to FIGS. 3-6. In some instances, timeline program 110 can be incorporated as a visual overlay on an existing mapping service. In other embodiments, timeline program 110 can be integrated with either an augmented reality or virtual reality device that can allow an immersive interaction with an event.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts Timeline program 110 and database 112. In this embodiment, Timeline program 110 resides on server computer 108 and can be implemented in a 5G infrastructure that interacts with cloud computing servers. For example, timeline program 110 can interact with remote service units (e.g., remote service units 116, also referred to as road side service units) and functional micro service pods 114 to receive and stream information regarding events (e.g., transmitting streaming data to Edge cloud over evolved multimedia broadcast service (eMBMS). In other embodiments, Timeline program 110 can have an instance of the program (not shown) stored locally on client computer device 102. In yet other embodiments, Timeline program 110 can be stored on any number or computing devices (e.g., a smart device). As discussed in greater detail with regard to FIG. 7, timeline program 110 can include one or more other components not shown in FIG. 1.

Timeline program 110 builds a database of events, determines significance of events in the database, and generates integrated displays for events that can be overlaid on existing mapping services. In this embodiment, timeline program 110 generates integrated displays by building a database of events. As mentioned above, an event can refer to one or more series of actions performed or participated by one or more users. For example, an event can include a concert, a parade, a party, a speech, etc. An event can have historical significance such as a manned mission to space or personal significance to a user (e.g., a birthday party).

In this embodiment, timeline program 110 can be configured to record and store information associated with an event for any configurable unit of time. In other embodiments, timeline program 110 can be sent information regarding events that have already transpired with known start and end times. In this embodiment, timeline program 110 receives and stores information regarding an event within a time period from one or more multiple sources (e.g., road side units, mobile computing devices, etc.). Information regarding an event can include start and end times of the event, one or more image, audio, and video files associated with the event, location information. For example, timeline program 110 can receive information regarding an event from a user (e.g., user uploaded images, audio, video, etc.). In other instances, timeline program 110 can access public databases that have information regarding an event (e.g., encyclopedia, permissioned access to one or more social media sites, etc.). In instances where timeline program 110 receives information from a user, embodiments of the present invention provide mechanisms for a user to opt-in and opt-out of data collection events (e.g., user information) and can, in some instances, transmit a notification that user information is being collected or otherwise being accessed and used. As used herein "user information" refers to information associated with a user and can be found in a user's profile, user preferences, display settings, device information, etc.

In some embodiments, timeline program 110 can record one or more actions for a configurable time period. For example, timeline program 110 can record actions performed in a public area (e.g., a series of cars driving in a line on a street). Timeline program 110 can then classify the one or more recorded actions as an event based on context. Continuing the example, timeline program 110 can classify the series of recorded actions as an event based on context.

Specifically, timeline program 110 can identify the presence or absence of users (e.g., via user devices indicated a threshold number of people) and conclude that the series of cars driving is an event (e.g., a parade) based on the context (e.g., number of people, crowdsourced information correlated with the actions, etc.).

Timeline program 110 can continually receive information (e.g., a live stream from remote service units 116), record one or more actions, and store the recorded one or more actions. For example, timeline program 110 can receive weather information (e.g., radar information), live stream videos from public cameras and can integrate information from a weather analysis module (not shown).

Timeline program 110 can then organize the received information by correlating location information (e.g., geo-tags, objects, and information associated with objects, i.e., knowledge aspects) with a received event and organize portions of the events based on time. In this embodiment, a time period associated with an event is user-defined. For example, a user can specify the time period for an event (start and end times). In other embodiments, timeline program 110 can be configured for any acceptable period of time. For example, timeline program 110 can, in some embodiments, determine that a time period for an event is one month. Timeline program 110 can then run de-duplication programs to determine when there are multiple viewpoints for an event and subsequently organize the viewpoints in a logical sense according to user profiles. For example, if the event is a concert at a venue, timeline program 110 can organize multiple viewpoints based on seating section.

Timeline program 110 can then classify the recorded events based on significance. In one embodiment, timeline program 110 can predict or otherwise identify a significance associated with an event as discussed in greater detail later in the Figures. In this embodiment, a numerical scale is used to identify one of three levels of significance, where lower numbers denote a lesser significance, while higher numbers indicate greater significance. For example, where a numeric scale of ten is used, a value of zero would indicate no significance, while a value of ten would denote the highest significance. Continuing the example, a value of five would have medium significance.

In instances where timeline program 110 determines a zero significance, timeline program 110 deletes the event, objects associated with the event, and information (e.g., a knowledge base) regarding the event. In other words, timeline program 110 does not waste resources saving or otherwise preserving the event, nor does timeline program 110 use any resources to generate a display that sequences the events.

In instances where timeline program 110 determines a low significance (e.g., a value between zero and four), timeline program 110 can take some action to record, save, and generate a display for the event. For example, timeline program 110 can save the event as a node that can be queried and save any text information associated with the event.

In instances where timeline program 110 determines a medium significance (e.g., where a value is calculated as reaching a value of five up to and including seven), timeline program 110 can take further action in recording, saving, and generating a display for the event. For example, timeline program 110 can save the event as a node and save one or more objects associated with the event, and information regarding the event.

In instances where timeline program 110 determines a high significance (e.g., where a value is calculated as being greater than eight), then timeline program 110 saves all information pertaining to the event. For example, timeline program 110 can save the event as a node and take further action by saving multiple data packets containing text, image, audio, and video files. Timeline program 110 can then save multiple identified objects in each of the received files, categorize and establish multiple viewpoints, and recreate the event in either pictorial, augmented reality, or virtual reality that allows the user to interact with specific objects and experience the event.

In yet other embodiments, timeline program 110 can receive user input that specifies an importance associated with an event. For example, in certain embodiments, a user can optionally tag an event as important (e.g., a birthday, a memory, anniversary, concert, etc.). For example, a user can tag that a learning institution is hosting an archery competition commemorate a fifth anniversary of the event. In this example, timeline program 110 has not flagged the archery competition as having high significance, however, the user has optionally tagged the event as "high significance". Timeline program 110 defaults to having this tagged event as private but can optionally be selected to be made public.

In scenarios where the user has optionally tagged an event as significant, timeline program 110 can independently verify the event as significant using a combination of machine learning, artificial intelligence algorithms, and crowd-sourced verification techniques. In scenarios where timeline program 110 cannot verify the user-tagged event as significant, timeline program 110 marks the event as having "claimed significance", in other words, the event is significant to the user. Timeline program 110 can then optionally provide the user with an ability to mark the event as public or private. Where timeline program 110 receives instructions to mark the event as private, timeline program 110 removes the event from the public database and the event is only viewable to the specific user. The user can then specify or otherwise grant permissioned accesses to one or more users.

Timeline program 110 can then create a visual representation of objects associated with the event as well as recreate one or more portions of the event that can be overlaid over an existing visual display. In this embodiment, the generated visual representation can be integrated (i.e., overlaid on top of) with pictorial representations of a map depicting a location, augmented reality display, or a virtual reality display. In other embodiments, the created visual representation can be integrated with any combination of existing displays.

In this embodiment, timeline program 110 can also provide graphical icons in the created visual representation that provide functionality. For example, in one embodiment, timeline program 110 can create a graphical icon that, when selected allows a user to select or otherwise alter a time period. For example, the graphical icon may be a selectable time slide feature that allows a user to select one or more time periods. Timeline program 110 can also generate a graphical icon that, when selected allows timeline program 110 to access databases of information associated with a depicted object. For example, when selected, timeline program 110 can access a database regarding cards to retrieve and display information about a car (e.g., previous designs, capacity, engine options, etc.). In some embodiments, timeline program 110 can use a combination of object recognition algorithms (e.g., to identify an object) and artificial intelligence algorithms to retrieve information associated with an identified object.

In this embodiment, an integrated display refers to a generated display that is generated for one or more pictorial display devices, augmented reality devices, virtual reality devices, and mapping devices. The integrated display can include an event comprising multiple portions and containing multiple viewpoints. For example, the integrated display can be used to view an event (e.g., a concert). The integrated display can be shown as part of an augmented reality display and can show a specific user's viewpoint as well as other viewpoints (e.g., different seating area), different angles of the stadium, etc. In this way, a user viewing the augmented reality display can experience the event.

In another example, the integrated display can be shown in virtual reality. For example, a user can interact with one or more components (e.g., objects) of the generated display. Specifically, a user can walk down the aisle of a concert, interact with a seat (e.g., seat) while the event is going on and view the event from one or more multiple angles (e.g., the chosen seat or another seat in a different section.

The user can then interact with one or more other objects in the generated display and can view a display of information associated with either that object or the event. For example, the user can select an object that represents an indexed set of information. Specifically, if the object is a ship in the middle of a show, the user can select a portion of the ship (e.g., the hull) to pull up information regarding the ship (e.g., it's origin, capacity, capabilities, etc.).

In another example, timeline program 110 can create a visual representation for pictorial depiction. For example, timeline program 110 can generate an interface and objects over an existing mapping service to provide a top-down depiction (e.g., where a user can zoom out in and out of a picture from a world view to a street level view). In this embodiment, timeline program 110 can integrate objects depicted with a user interface such as a time selectable slide option that provides the user with the ability to view an event from multiple periods of time.

In yet another example, timeline program 110 can receive a request to display an event several years earlier. In this example, the user has additionally specified a date of Aug. 15, 2019 and time of Monday, 9:00 am. In this example, and in response to this request, timeline program 110 can identify there was one event with a high significance. Timeline program 110 can then accordingly generate a display that depicts one or more stored objects associated with the event and create one or more multiple views for the user. In this event, there was a congressional convey of policy makers crossing on the a road in a city. The user in this example had not participated or seen this convey in person.

In response to receiving the request to display the event, timeline program 110 can recreate one or more portions of the event for the user. In this example, the user has selected a time period between 8:00 am to 10:00 am. Timeline program 110 can then recreate the objects to be displayed in augmented reality or virtual reality to allow the user to visually see one or more portions of the event. In this example, timeline program 110 recreates an image of the convey and indicates the recreated image is selectable. In response, to receiving a request to display information associated with the selected image, timeline program 110 can display a video of the convey.

In another embodiment, timeline program 110 can recreate each individual object of the event (e.g., the street, vehicles, signs, images of persons on the street with facial identifying features of the persons blurred out for privacy, etc.). For example, the user can zoom out and select an image of one of the persons depicted in the convey. Timeline program 110 can then identify that person as a public figure and display information associated with that public figure (e.g., the person's resume and other publicly available information).

Timeline program 110 can then resume playing the video or allow a user to interact with the integrated display. For example, the user interacts with the generated street view and sees a stone sculpture shop that displays a peculiar stone outside the shop. The user can then interact with the generated view and select the stone. Timeline program 110 can then transmit instructions to a cognitive artificial intelligence module (not shown) and determine the stone is made of slate and display information associated with the object (e.g., the stone). In certain embodiments, timeline program 110 can then query the user if the user would like additional anthropological or geological information about the stone or whether the user would like to resume experiencing the generated view (e.g., video).

Continuing the above example, the user has selected to resume the video. The user recognizes another object in the generated display and selects a red car following the convey. In response to receiving a user selection of the red car, timeline program 110 can display information associated with the red car (e.g., make, model, production year, options associated with the car, miles per gallon, previous model information, etc.). Optionally, timeline program 110 can display another selectable graphic titled, "Knowledge Aspect". In response to a user selecting this feature, timeline program 110 can then provide additional information regarding the history of a car in general, parts of the car, engine designs, etc.

In this embodiment, database 112 functions as a repository for stored content. Database 112 can reside on a cloud infrastructure and stores user generated information. In some embodiments, database 112 can function as a repository for one or more files containing user information. Database 112 can further store current crowdsourced navigation information (e.g., current traffic event data), GPS indexed historic crowdsourced traffic event data, GPS, indexed historical weather data, GPS indexed historical traffic event data, and current GPS location services data). Database 11 can further store user-generated tagged events or events that timeline program 110 can then subsequently determine the significance value of each stored event. In this embodiment, database 112 is stored on server computer 108 however, database 112 can be stored on a combination of other computing devices (not shown) and/or one or more components of computing environment 100 (e.g., client computing device 102) and/or other databases that has given permission access to Timeline program 110.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 4:
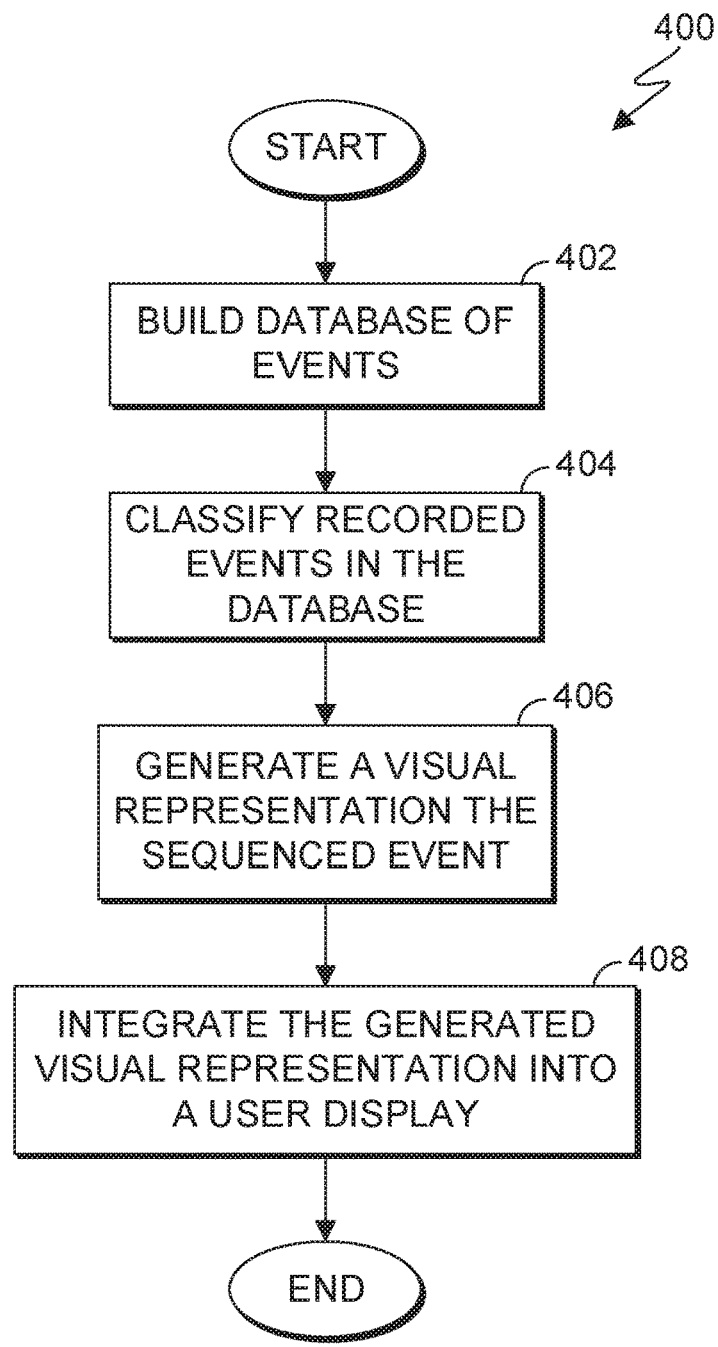
FIG. 4 is a flowchart depicting operational steps for generating a visual representation of a sequenced event, in accordance with an embodiment of the present invention.

FIG. 4 is a flowchart 400 depicting operational steps for generating a visual representation of a sequenced event, in accordance with an embodiment of the present invention.

In step 402, timeline program 110 builds a database of events. In this embodiment, timeline program 110 builds a database of events after receiving information, correlating location information with a received event, organizing portions of the event, and organizing viewpoints associated with the event, as discussed in greater detail with regard to FIG. 5.

In this embodiment, timeline program 110 receives information associated with an event. In this embodiment, timeline program 110 receives information by transmitting a request to client computing device 102 for information. Information received by timeline program 110 generally refers to information associated with an event and can include location information, one or more, textual, pictorial, audio, and video files associated with either a location or an event.

Information received by timeline program 110 can also refers to one or more user information that refers to details associated with an event and other user information that can be found in a user's profile, user preferences (routines, pre-defined responses to events, and other constraints), and in certain circumstances, the user's social media, position information (e.g., directional information or changes in directional information that includes a user's location along with information surround an area) of a user, and any, crowdsourced data, weather data, etc.). Timeline program 110 can receive event information from a user by transmitting instructions to sensors (e.g., remote service units).

In certain embodiments, timeline program 110 can be given permission access by a user to access user information directly from client computing device 102 at regular, pre-defined intervals. In other embodiments, user information can be sent from client computing device 102 to timeline program 110 at regular intervals. In circumstances where user information resides on multiple sources (e.g., multiple computing devices), timeline program 110 can invoke a merger module (not shown) to combine and de-duplicate duplicative user information.

In step 404, timeline program 110 classifies recorded events in the database. In this embodiment, timeline program 110 classifies recorded events in the database based on context and significance as discussed in greater detail with regard to FIG. 6. In this embodiment, a numerical scale is used to identify one of three levels of significance, where lower numbers denote a lesser significance, while higher numbers indicate greater significance. For example, where a numeric scale of ten is used, a value of zero would indicate no significance, while a value of ten would denote the highest significance.

In step 406, timeline program 110 generates a visual representation of sequenced events. In this embodiment, Timeline program 110 generates a visual representation of the move by organizing objects associated with the event and ordering images and media in a sequential order, based on time such that earlier events are shown before later events.

Optionally, timeline program 110 also creates graphical icons that, when selected, provide additional functionality for the generated visual representation. For example, timeline program 110 can create a graphical icon that allows a user to tag an object in a visual representation. Timeline program 110 can also create and subsequently display a graphical icon that allows a user to select a range of time period. For example, the graphical icon can be a slide-able button that allows a user to select a time period of one or more hours. Timeline program 110 can also create a graphical icon that allows a user to retrieve information regarding an object displayed in the visual representation. For example, in response to selecting the graphical icon, titled "knowledge base", timeline program 110 can transmit instructions to retrieve and subsequently display information regarding a selected object (e.g., retrieve and subsequently display information regarding an object, for example, a car depicted in the visual representation.

In step 408 timeline program 110 integrates the generated visual representation into a user display. In this embodiment, timeline program 110 integrates the generated visual representation into a user display by overlaying the generated visual representation into the user display. For example, timeline program 110 can generate a dual view mode in the user display. When selected, timeline program 110 can optionally overlay objects associated with an event in a street view in either a two-dimensional or three-dimensional display.

In instances, where timeline program 110 integrates the generated visual representation into an augmented reality display, timeline program 110 can position objects associated with the event around detected objects in the user's physical world. In this embodiment, timeline program 110 can recreate objects and events around the user's environment that, when selected, can provide additional information regarding the object. In this way, a user can select an event that took place in a room in the user's house. Timeline program 110 can recreate positions of objects and their previous location and/or reproduce images of items that are no longer there.

Timeline program 110 can additionally provide one or more display icons (e.g., icons that link to one or more crowdsourced databases, icons that change display modes, icons that the user interface display such that different images can be displayed), that, when selected can change what is shown in the dual view mode.

Figure 5:
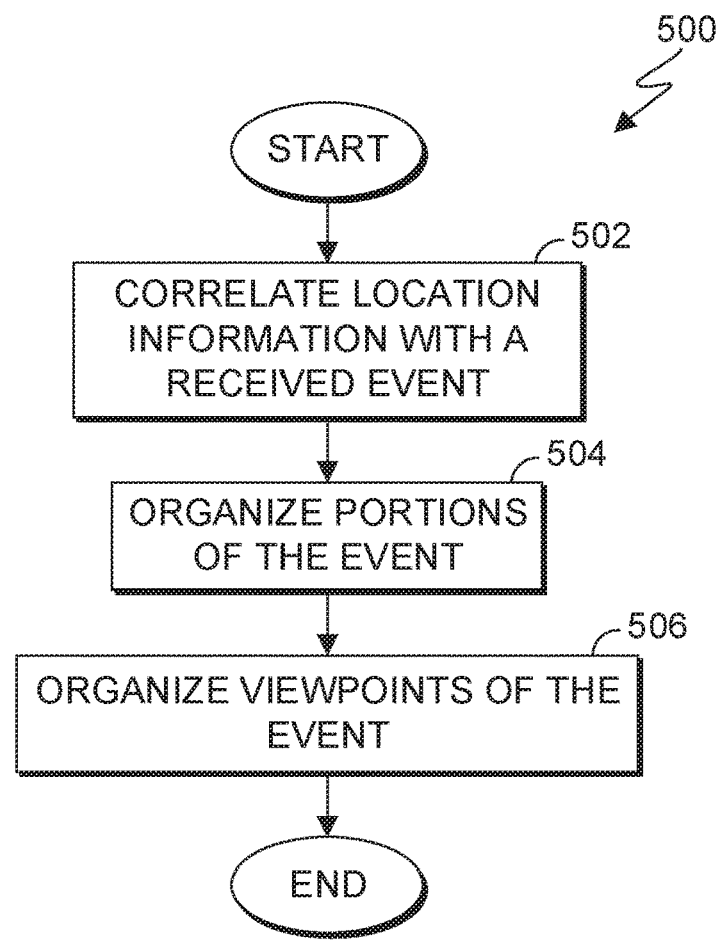
FIG. 5 is a flowchart depicting operational steps for building a database of events, in accordance with an embodiment of the present invention.

FIG. 5 is a flowchart 500 depicting operational steps for building a database of events, in accordance with an embodiment of the present invention.

In step 502, timeline program 110 correlates location information with a received event. In this embodiment, timeline program 110 correlates location information with a received event by mapping location information to received objects. For example, timeline program 110 can read metadata associated with a received object and determine the received object (e.g., picture) was taken in a particular city. In other embodiments, timeline program 110 can read GPS coordinates associated with an image. Timeline program 110 can then leverage object recognition algorithms to identify objects associated with an image and further store locations associated the identified objects. In other embodiments, timeline program 110 can also identify objects depicted in audio, video files repeating the same process (e.g., processing metadata and mapping location information to identified objects of the event).

In step 504, timeline program 110 organizes portions of the event. In this embodiment, timeline program 110 organizes portions of the event based on chronological order. In some embodiments, timeline program 110 organizes portions of event (i.e., detected objects in media received) based on metadata associated with received content (e.g., geo location and time stamps). In embodiments where timeline program 110 is unable to read metadata associated with received content or otherwise cannot access the metadata, timeline program 110 can reference social media website and other public crowdsourced data to identify a time associated with similar content. For example, where timeline program 110 receives content (e.g., image, text, audio, video, etc.) from a user, timeline program 110 can access a social media account of the user (with the user's permission) and read user generated text (e.g., any tags the user adds that describe the event) and identify other user generated tags associated with similar content (e.g., timeline program 110 can identify concert 1 by band X and find other content with time and location information for concert 1 by band X).

In step 506, timeline program 110 organizes viewpoints of the event. In this embodiment, timeline program 110 organizes viewpoints of the event based on user preferences. In some embodiments, organizes viewpoints of the event based on a user's point of view first and then can optionally provide multiple views from other shared content. For example, where a concert is designated as an event, timeline program 110 can provide additional, optional views of the stage. The first view timeline program 110 provides is of the user's submitted content (e.g., user's point of view pictures, video, audio, etc.). Timeline program 110 can optionally provide other user's submitted content associated with the event (e.g., sitting in a different section).

Figure 6:
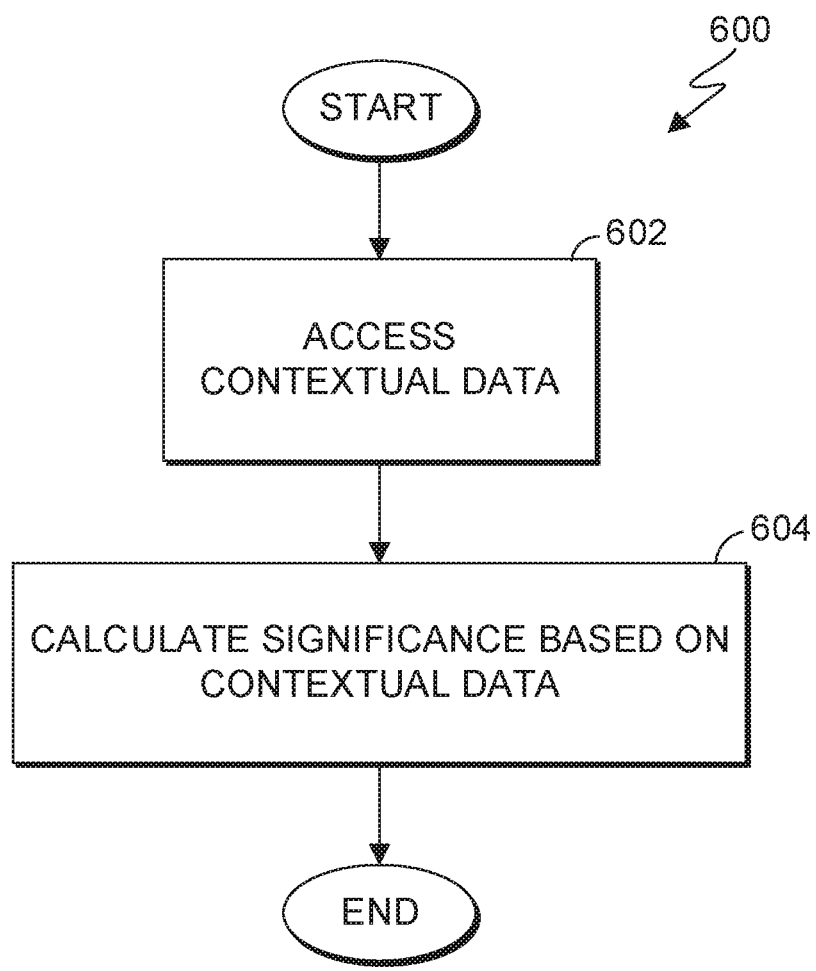
FIG. 6 is a flowchart depicting operational steps for determining a significance of an event based on contextual data, in accordance with an embodiment of the present invention.

FIG. 6 is a flowchart 600 depicting operational steps for determining a significance of an event based on contextual data, in accordance with an embodiment of the present invention.

In step 602, timeline program 110 accesses contextual data. In this embodiment, timeline program 110 accesses contextual data by processing received content using a combination of machine learning and artificial intelligence algorithms. For example, timeline program 110 can access textual data and identify location data associated with an event. Timeline program 110 can then correlate location data with an event (e.g., timeline program 110 can identify that there were at least 500 individuals in the location. In this example, timeline program 110 can then identify there is an event at the location. Timeline program 110 can then access other public databases to identify information associated with the location during a time period. In other embodiments, timeline program 110 can receive textual input from a user specifying context. For example, a user can specify a context for an event as being personal (e.g., a birthday).

In step 604, timeline program 110 calculates a significance of an event based on the contextual data. In step 308, timeline program 110 generates a score for an event. In this embodiment, timeline program 110 generates a score for an event by utilizing a significance prediction algorithm that assigns weight values to one or more objects associated with a respective event. For example, timeline program 110 can identify the presence or absence of one or more users at an event based on devices connections to a hotspot (e.g., cellphone tower, WiFi router, etc.). In this example, timeline program 110 can have a threshold of 500 users, that is, an event having 500 users present is indicative that an event is significant. Accordingly, timeline program 110 can then assign a higher weight value for the presence of users at an event.

In other embodiments, timeline program 110 can further weight other factors like the presence or absence of a public figure. Timeline program 110 can further consider other factors such as reoccurring events associated with significance (e.g., national holidays, sporting events, etc.) Timeline program 110 can then add the assigned weight values for each factor or object associated with the event and determine a total score for the movement. In another embodiment, timeline program 110 generate a risk score for a move by assigning a confidence value for the event utilizing a combination of one or more predictive analytics, and artificial intelligence algorithms. Accordingly, in response to the generated score reaching or exceeding a threshold value for significance, timeline program 110 can classify the event as significant.

As previously discussed, in instances where timeline program 110 determines a zero significance, timeline program 110 deletes the event, objects associated with the event, and information (e.g., a knowledge base) regarding the event. In other words, timeline program 110 does not waste resources saving or otherwise preserving the event, nor does timeline program 110 use any resources to generate a display that sequences the events.

In instances where timeline program 110 determines a low significance (e.g., a value between zero and four), timeline program 110 can take some action to record, save, and generate a display for the event. For example, timeline program 110 can save the event as a node that can be queried and save any text information associated with the event.

In instances where timeline program 110 determines a medium significance (e.g., where a value is calculated as reaching a value of five up to and including seven), timeline program 110 can take further action in recording, saving, and generating a display for the event. For example, timeline program 110 can save the event as a node and save one or more objects associated with the event, and information regarding the event.

In instances where timeline program 110 determines a high significance (e.g., where a value is calculated as being greater than eight), then timeline program 110 saves all information pertaining to the event. For example, timeline program 110 can save the event as a node and take further action by saving multiple data packets containing text, image, audio, and video files. Timeline program 110 can then save multiple identified objects in each of the received files, categorize and establish multiple viewpoints, and recreate the event in either pictorial, augmented reality, or virtual reality that allows the user to interact with specific objects and experience the event.

FIG. 7 is a sample data element representation, in accordance with an embodiment of the present invention, in accordance with an embodiment of the present invention.

Figure 3:
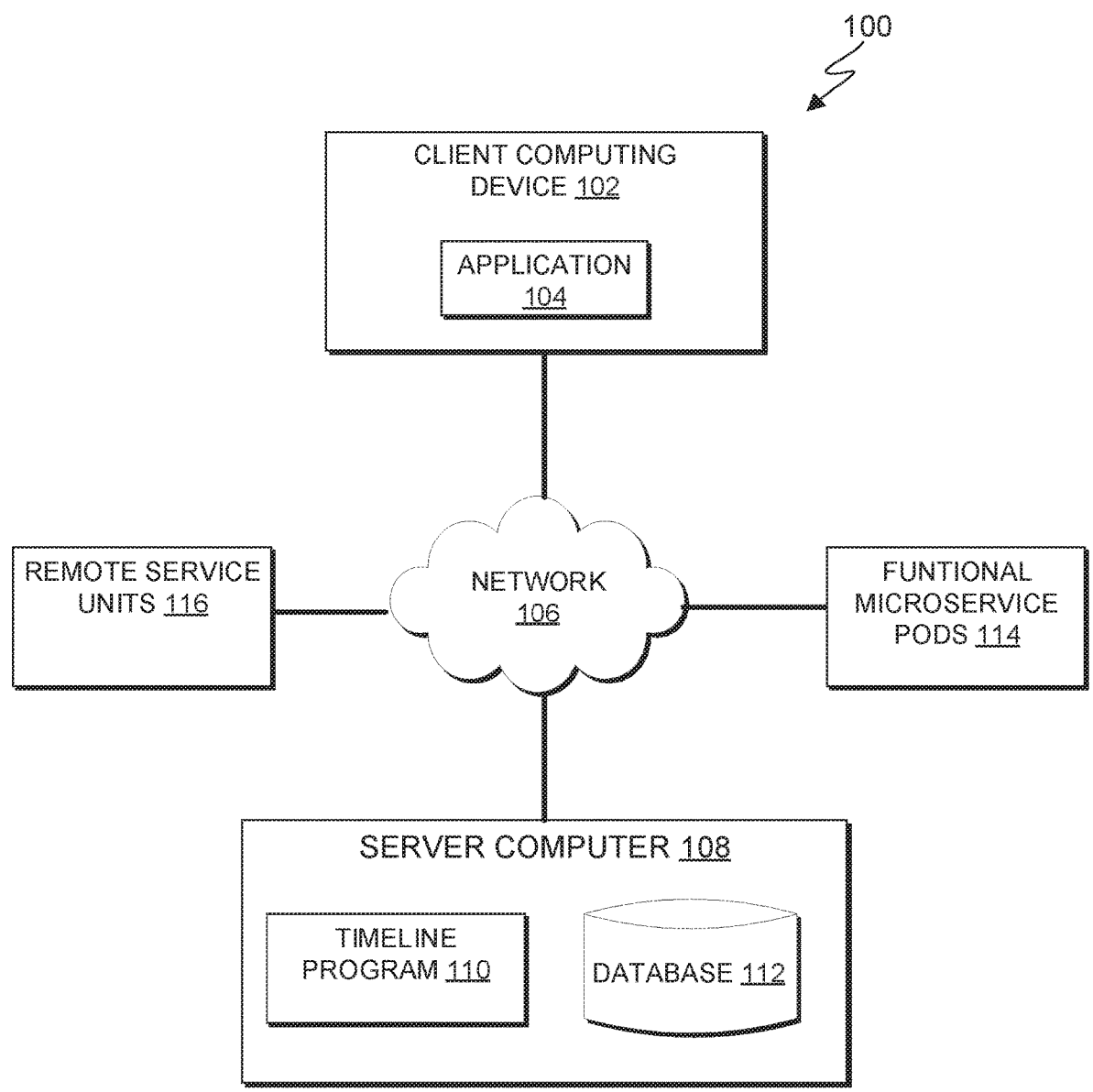
FIG. 3 is a functional block diagram illustrating a computing environment, in accordance with an embodiment of the present invention.

In this embodiment, timeline program 700 shows an example of certain modules not present in FIG. 3. Timeline program 700 is another embodiment of timeline program 110. In this embodiment, timeline program 110 includes a time span array module, a cognitive area aggregation module, a timeline module, an eye span module, an event wise cognitive association module, an area aggregation weather module, a weather sentiment analyzer, a remote service units, also referred to as road side service units, a cognitive event distribution engine, a discretized event wise time break assignment instantiation, and an event area time instance tagging module. Each of these modules are explained in greater detail in FIG. 8.

Figure 8A:
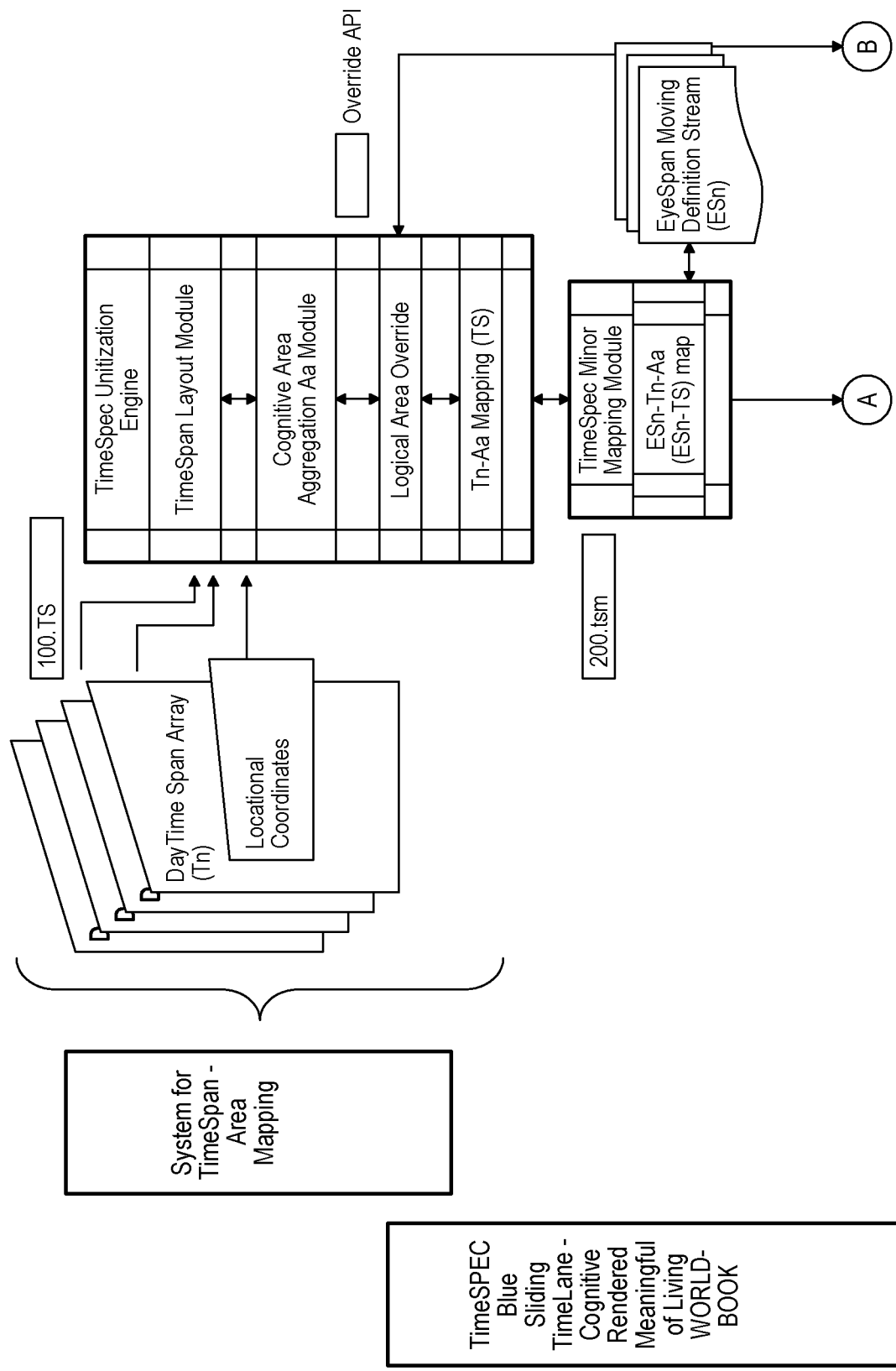
FIGS. 8A-8C shows a flowchart depicting operational steps for an alternate method to generate a visual representation of a sequenced event, in accordance with an embodiment of the present invention.
Figure 8B:
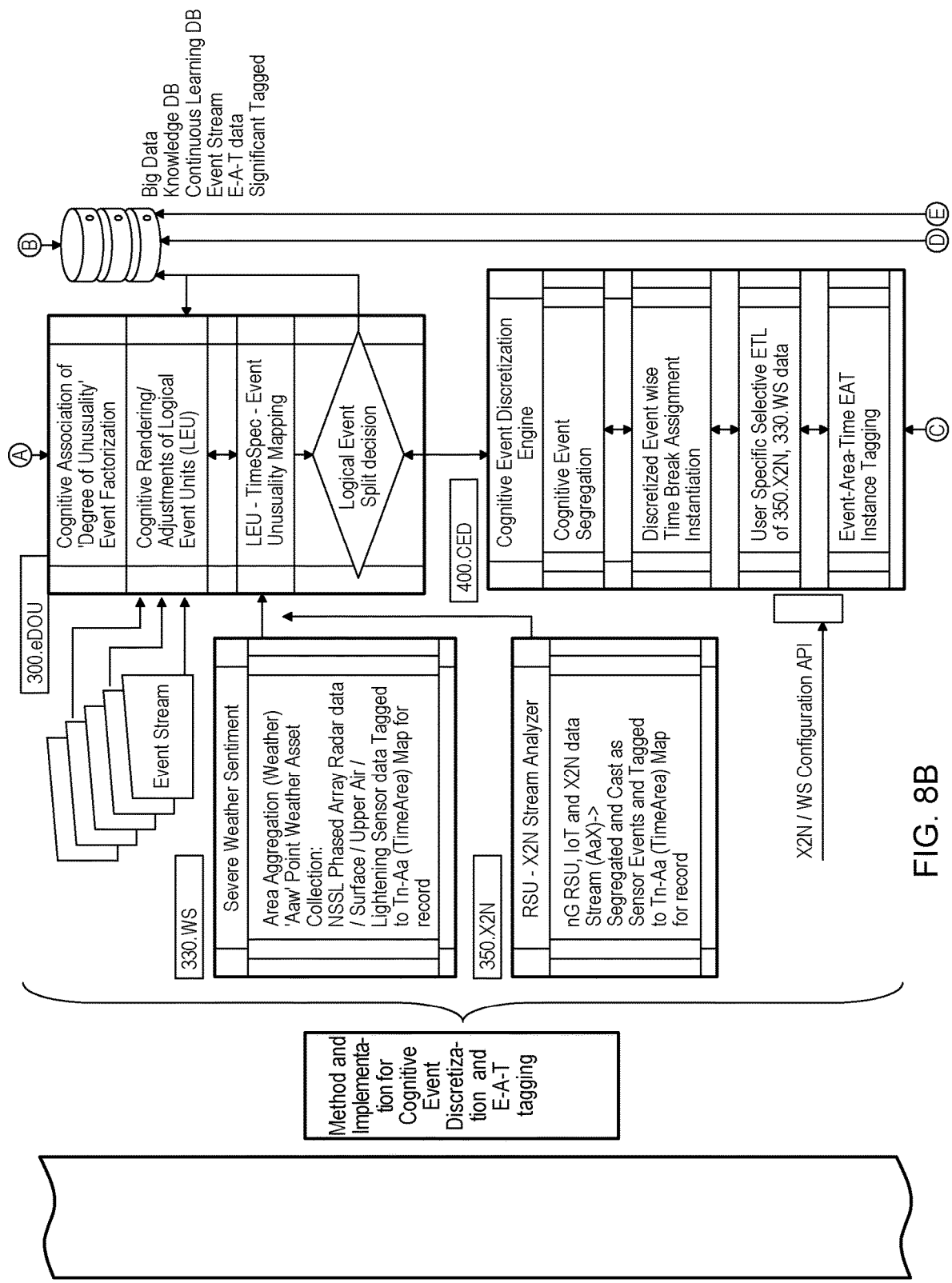
Figure 8C:
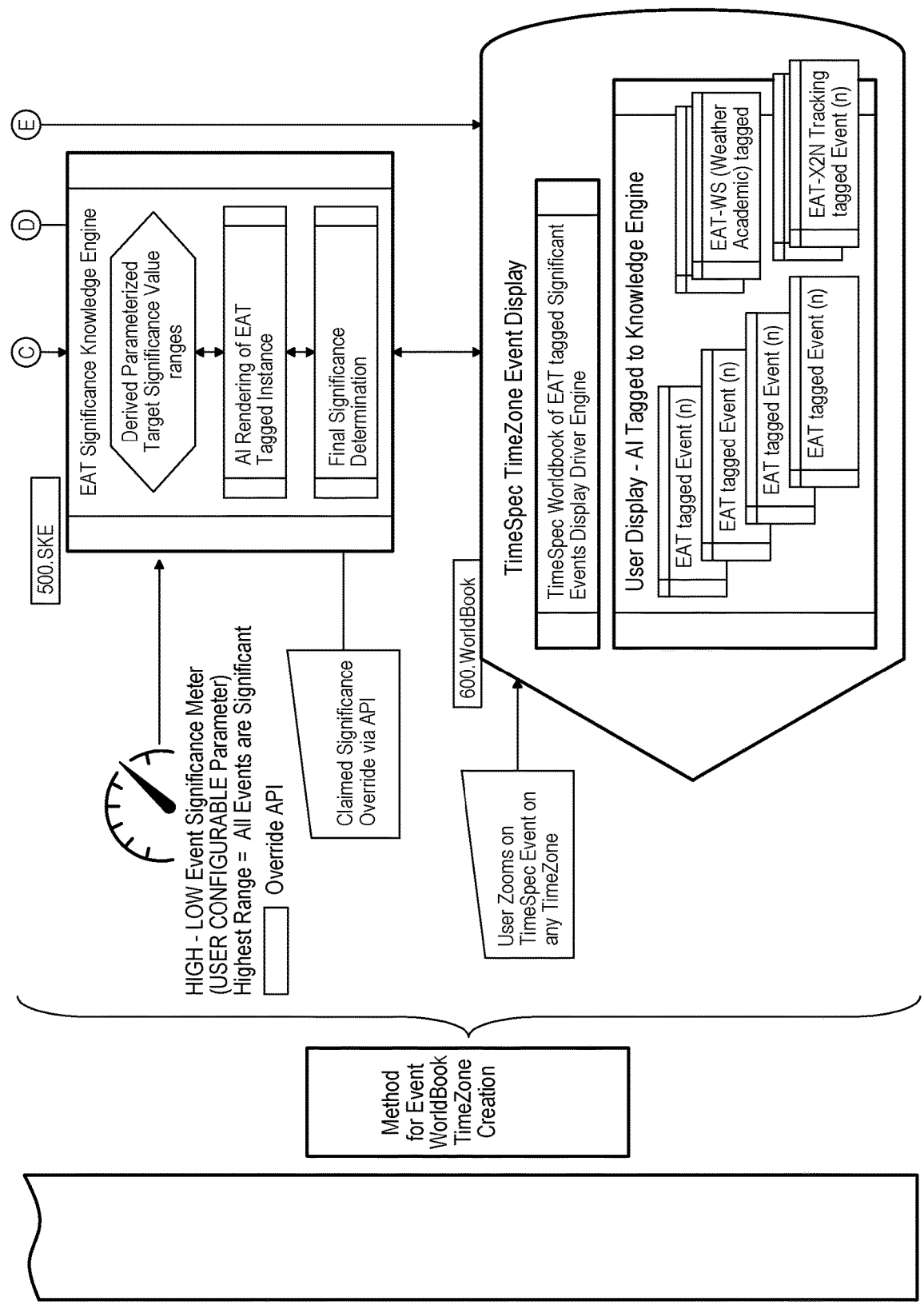

FIGS. 8A-8C shows a flowchart depicting operational steps for an alternate method to generate a visual representation of a sequenced event, in accordance with an embodiment of the present invention.

In FIG. 8A, timeline program 110 receives information associated with an event, calculates a significance associated with the event, and creates an event display that can be integrated with a display device. In this embodiment, timeline program 110 collects and receives information and identifies events passively, that is, timeline program 110 can receive information and determine events and level of significance associated with an event on its own without user intervention. In other embodiments, timeline program 110 can receive input from a user (e.g., a manual override) as discussed in earlier flowcharts.

In this embodiment, timeline program 110 receives location information and a monitors for an event within a configurable time period. In this embodiment, timeline program 110 uses its utilization engine, layout module, cognitive area aggregation module, logical area override and mapping module to process the information.

A unitization engine as used herein is a component of timeline program 110 and is the core of the 'System for TimeSpan-Area Mapping'. The unitization engine determines and unitizes the length and volume of the 'TimeSpec'. As used herein, "TimeSpec" is the smallest unit in this invention and can be visualized in two forms: A TimeSpec Major unit (referred to as TS unit in this embodiment) and A TimeSpec Minor Unit (referred to as TSM unit in this invention).

The TimeSpan layout module takes in the "Day and Time" as an array of inputs since the start of the implementation of this invention or start of the recording of the events and stores in the systems as TimeSpan Array=Tn for further association with the location (e.g., area aggregation) to be derived in the Cognitive Area Aggregation (Aa) Module. Events of this universe is of varied nature and varies with respect to location and time. The location of each event may fill in a finite amount of space called AREA (A) in this invention which may be ranging from Latitude X: Longitude Y to Latitude X+nx: Lonitude Y+ny on ground and could take up the 3rd Dimension depending on the scale and magnitude of the event.

The cognitive area aggregation module makes the application intelligent and cognizant of the Event as well as of the locational space. This unique feature makes it "Event Driven" as well as "Location Driven" along the Time Array. Cognitive area aggregation module enables this feature from a location perspective. For example, cognitive area aggregation module cognitively aggregates groups of geographical points (e.g., A=Latitude:Longitude) and is shown as Cognitive Area Aggregation (Aa). In certain embodiments, the cognitive area aggregation module includes a configurable manual override.

In an example, a location may be a popular coffee shop located on NW 10th Street can be located by a set of geographical points A=Latitude:Longitude. Locations such as the Palm Terrace on W University Ave Florida can also be similarly located. Embodiments of the present invention differs in that, in some embodiments, timeline program 110 cognitively associates and aggregates both these as within an area of a university in Florida. Timeline program 110 can then form a Cognitive Location unit called Cognitive Area Aggregation (Aa=part of the area of the university in Florida) using the cognitive area aggregation module.

The logical area override API provides the manual override finalization of all such system generated cognitive decisions and allows for splitting of the Aa. Continuing the example above, if a user believes that Aa of =part of the vicinity of a university in Florida area is too big an area to include the coffee shop, this API can be used to spilt into one or several smaller Aa sub-areas.

The mapping module maps each Tn in the Time Array to a logical Aa to create TimeSpec Mapping (e.g., Tn-Aa). For each Tn in the Time Array recorded there is associated all logical Aa in one to many relationships. This is because at a particular Tn moment, each different Aa may have been experiencing different events as determined in the Logical Event Units (LEU) and Logical event split cognitive decisions in the later part of this invention. This Tn-Aa Map achieved as explained above is called TimeSpec Major Unit (TS unit) in this invention.

Timeline program 110 can then further process the information using its minor mapping module and receive updates to an event using an Eyespan moving definition stream module. Timeline program 110 further includes a TimeSpec minor module. This module brings in part of scalability factor and is available technology dependent. Timeline program 110 can utilize 3D Stereo Video Analytic sensors and Fish-eye Video sensors in combination with the TimeSpec Minor Mapping Module to automatically adjust itself with the incoming Video stream by intelligently estimating the video quality in any number of manually input parameters as might be thought of at any point in time. Timeline program 110 can merge or discretize stream inputs from several input points it is necessary for the system to understand the "EyeSpan limits" of each stream. For example, the EyeSpan of recent technology 3D Stereo Video records 3D extreme stereoscopic views are significantly enhanced with increased number of parameters compared to older technology video streams from normal video cameras. The term 'EyeSpan' is coined in this invention to specify the parameterized Video input streams. To continue with the example, the 3 d Video Stereo streams may be coupled with Fish-eye Video sensors for panoramic streams and thus further increase the quality input parameters and all are thus captured by the EyeSpan open system which shields the system from technological obsolescence. EyeSpan parameter adjustments based on incoming Video stream parameters in turn adjusts the TimeSpec Major units determined in previous module and result into available technology realistic (video technology agnostic) view images which is referred to as ESn-Tn-Aa (ESn-TS) Map=TimeSpec Minor Unit (tsm unit).

In FIG. 8B, timeline program 110 can then proceed with the method and implementation for Cognitive Event Discretization and Event-Area-day & Time (referred to as EAT or E-A-T where an event is defined as an LEU, and an area is defined as Aa, (Cognitive Area Aggregation with manual override configurable, A=Latitude Longitude)) Tagging as part of preparation for machine learning and real life processing of event streams. In this embodiment, timeline program 110 discretizes events for further process by utilizing its cognitive association module to calculate a degree of unusuality or Deviation (e.g., how an event differs from what is expected). In this example, timeline program 110 can receive event streams from one or more sources and processes the received information using its cognitive render and adjustment module to calculate the degree of deviation from the normal or expected.

In this embodiment, timeline program 110 performs a cognitive association of a calculated degree of unusuality with an event factorization module. In this embodiment, this is the module with artificial intelligence which processes the different video stream inputs, calculates the degree of deviation from the normal or expected and then results into outputs of different "High Level Events" that are referred to as LEU (Logical Event Units) from the continuous stream of video inputs. For example, if there is a continuous stream of video of moving vehicles on a road, this module will be able to differentiate between normal running of vehicles and a special formation of vehicles (e.g., a diplomatic convey of vehicles. This module also provides the ability to identify or differentiate between a sports event happening and an empty stadium, and similarly identify or differentiate between normal movement of people and a sudden gathering of individuals. This module can similarly identify sudden movement of an individual that differs from a baseline measurement for that individual (e.g., a normal jog versus a sprinting away from a dangerous situation) classified as LEU. This differential understanding by the module is achieved by leveraging submodules such as the cognitive rendering to provide adjustments of Logical Event Units (LEU) and LEU-TimeSpec-Event Unusuality Mapping sub modules within the Cognitive Association of 'Degree of Unusuality' Event Factorization module which works together along with the next Logical Event Split decision block by employing different AI Classification Algorithms which calculates the degree of deviation from the normal or expected. This module will undergo Machine Learning with various Supervised Learning Training data sets, and then appropriate artificial intelligence algorithms (for example like Perceptron Algorithm with item weight values estimated using Stochastic Gradient Descent on the training data) for event classifications.

Timeline program 110 can further refine its process leveraging a Big Data knowledge database. The finalized model as arrived above during the Supervised Machine Learning is then applied on the real-life video stream inputs. Timeline program 110 can then use real life video stream from one or several input streams to verify the degree of deviation from the normal or expected event data as machine learned using an iterative model of Logical Event Split decision block. This Logical Event Split decision block is a repetitive loop back for verification before final decision making is made because of the overlapping information and because of unique aspects of the Event streams.

Timeline program 110 can employ one or more probabilistic classifiers like Logistic Regression. Timeline program 110 can then generate a probability of the part of the Event being deviated from normal or expected stream data. The Event Classification Decision arrived loops back to Cognitive Rendering/Adjustments of Logical Event Units (LEU) and LEU-TimeSpec-Event Unusuality Mapping submodules until such time that the Decision is finalized by iterative Adjustments to the Event Splitting as needed. Thus, timeline program 110 can achieve a higher cognitive state is satisfactorily achieved via above Machine Learning with high EPOCH values and including but not limiting to probabilistic AI Algorithms. Timeline program 110 employs very high epoch values for better training the system during supervised machine learning when ingesting worldwide continuous, public video stream event data being huge in nature. Timeline program 110 can also use known AI algorithm optimization methods for sustaining the higher cognition state achieved by the several methods as explained above.

Timeline program 110 can then continue processing by mapping the event into separate domains. In this embodiment, the weather sentiments released and captured by worldwide weather agencies can be integrated within timeline program 110. In other embodiments, timeline program 110 can access a weather sentiment module of weather agencies. With the sustained higher cognition state achieved by above mentioned methods, timeline program 110 then proposes a novel Weather Sentiment Analyzer by employing a System for Severe Weather Sentiment learning for Weather Forecasting Agencies via Tn-Aa (TimeSpec) weather Sentiment Learning Gradient with Weather LEU Deviation Unusuality mapping. Timeline program 110 calculates Area Aggregation Weather (termed as Aaw in this invention) by leveraging several weather sensor data recorded by Weather Agencies like for example, the various Phased Array Radar data/Surface/Upper Air/Lightening Sensor data and then Tagging them to Timeline program 110 TimeSpec (Tn-Aa TimeArea) Map.

Timeline Program 110 then splits the Weather stream events captured by the various sensors into Weather Logical Event Units (LEUs) and profitably attains the higher cognition state by the above-discussed methods via earlier modules. The results of this Weather Sentiment Analyzer module can then be used by the Weather Agencies to verify the correctness of the Weather Sentiments captured by the Agencies at various points in time in history by comparing with the actual past weather events at any geographical location as can be displayed by timeline program 110. Accordingly, using the now made available worldwide historical comparison results, other entities such as weather agencies can benefit by improving their own learning so as to better predict by fine tuning the Sentiments for future Weather Predictions.

Timeline program 110 stores cognitively segregated, historical severe weather events as worldwide Logical weather Event units that includes difficult terrains viewable across historical timeline for easy comparison. Timeline program 110 can segregate and tag constellation wide universal weather or any recordable events with TimeSpec over Time-Line for Astronomical analysis as technologically recording capabilities matures and becomes available. This feature can even be extended to events at universal or constellation level. In one embodiment of this module can help a Weather Analyst to generate Sentiment Learning Gradient by verification on the Sensor Data recorded by timeline program 110 and paired with the Sentiment Analysis. The user (e.g., a weather analyst) can also view natural hazardous events like blizzard or tornado in literally inaccessible areas that occurred in the past. In another extended deployment of an embodiment of the present invention, records of constellation level events like movement of meteor or any other space objects for studies.

Timeline program 110 can then continue processing by mapping the event into more separate domains. In this embodiment, timeline program 110 can then utilize its cognitive event discretization engine to identify an event, identify other objects in the event. Timeline program 110 can then continue processing by mapping the event into more separate domains. One of the greatest utility is obtained by capturing and processing different nG sensor data (as technology matures and moves from 5G to nG) for example, 5G Dedicated Network Slice for Massive IoT sensor data. In this embodiment, timeline program 110 and its cognitive event discretization engine can particularly be designed to process such data including fine tuning of LEU determined in earlier modules with the same Method and Implementation for Cognitive Event Discretization and EAT Tagging. Timeline program 110 can generate more use cases by combining and cognitive rendering of the historical Massive IoT Sensor data. For example in one embodiment, timeline program 110 enables a comparison of the historical performance of one or more autonomous vehicle engine and the corresponding quality of remote maintenance services completed as part of the cognitive association of nG RSU Sensor Stream module of this invention. In this example, timeline program 110 records all the V2N event data generated by the autonomous Vehicular Device exchanged with the Automotive Remote maintenance systems that communicates over the 5G dedicated network slice for Autonomous vehicles. Over time, these events are EAT tagged and cognitively discretized as explained in this module of the invention making it possible to generate analytics on autonomous vehicular performance and corresponding remote service performed.

In this example, the cognitive event discretization engine contains several submodules. For example, the cognitive event discretization engine includes a cognitive event segregation module, a discretized event wise time break assignment instantiation module, and a user selective module. The user selective module leverages the optional User Integrated Modules (nG Road Side Unit (RSU)—X2N 5G or nG Stream Analyzer and Severe Weather Sentiment Analyzers. The User Specific Selective ETL of X2N, WS Option Module can employ a X2N/WS Configuration API to achieve this.

The Cognitive Event Discretization engine from one perspective can be viewed as a large database where all LEUs determined earlier are taken as inputs including the massive IoT nG sensor data events. From this database, this engine performs the final segregation of highly complex set of specialized IoT events and normal video recorded LEUs using a cognitive event segregation module which identifies and classifies all into respective separate domains (specialized nG IoT/Weather/normal recorded life events etc.) by cognitive classification techniques. Timeline program 110 then processes each of these classified LEUs by instantiating Time Break Assignment which determines the TimeSpan that will be associated with each classified and registered LEUs and associates the Day&Time to the LEU. Timeline program 110 then allocates the TimeSpec (Day&Time&AaArea) to each of the registered LEUs by Event-Area-Time EAT Instance Tagging. At this stage all the events received by the Timeline program 110 thus are completely segregated and logically aggregated into units making each event of respective domains (video event stream domain or weather asset events domain or nG IoT sensor domain etc) cognitively meaningful and ready for consumption or for further processing.

In FIG. 8C, timeline program 110 can then feed the results of the earlier step into its knowledge engine to identify a significance associated with an event. Significance Metering and Claimed Significance override is yet another feature of the timeline program 110 which will allow users access to any events. For example, timeline program 110 can utilized significance metering to monitor for accidental, intentional, or unintentional events needed by responsible entities.

In this embodiment, "Events of Significance" may include all events of natural disasters at any particular location on Earth and can also include constellations. Events of significance can also include acts that are in violation of governing laws and regulations. Timeline program 110 can predict and allow users to override the significance value associated with an event. This is achieved by classifying the events on vector scale first with confidence-weighted linear classifier and the output can then be passed through a Support Vector Machine Algorithm with manually configurable high C hypermeter to minimize any mis-classification even if margin error may be high with high EPOCH values until optimized.

In this approach all events which are otherwise classified with low significance with respect to public in general (and hence stored temporarily or put up for deletion as per configuration) but could be of high from personal perspective or for a group of people or one or more institutions, timeline program 110 then allows users to override the Significance factor allocated by the system, thus making such events available for the requester for any amount of time as configured. In one embodiment example for such cases, timeline program 110 provides API to override "C" hyperparameter of the Support Vector Machines to a low or very value to allow storage of otherwise low significant events. In another embodiment, all events irrespective and with complete override of the significance is stored when such storage is technologically made feasible.

Finally, timeline program 110 creates a visual representation of the event. The event display can be a display that overlays on top of a mapping services and displayed either a 2D or 3D street view. In embodiments where the generated display is for augmented reality or virtual reality display, timeline program recreates the objects of the event for the display medium. In this embodiment, timeline program 110 creates its visual representation utilizing an event display module. This display module include tagged events that have a high level of significance and includes an artificial intelligence tagged knowledge engine that includes multiple tagged events and multiple weather information and tracking modules for the tagged event.

Figure 9:
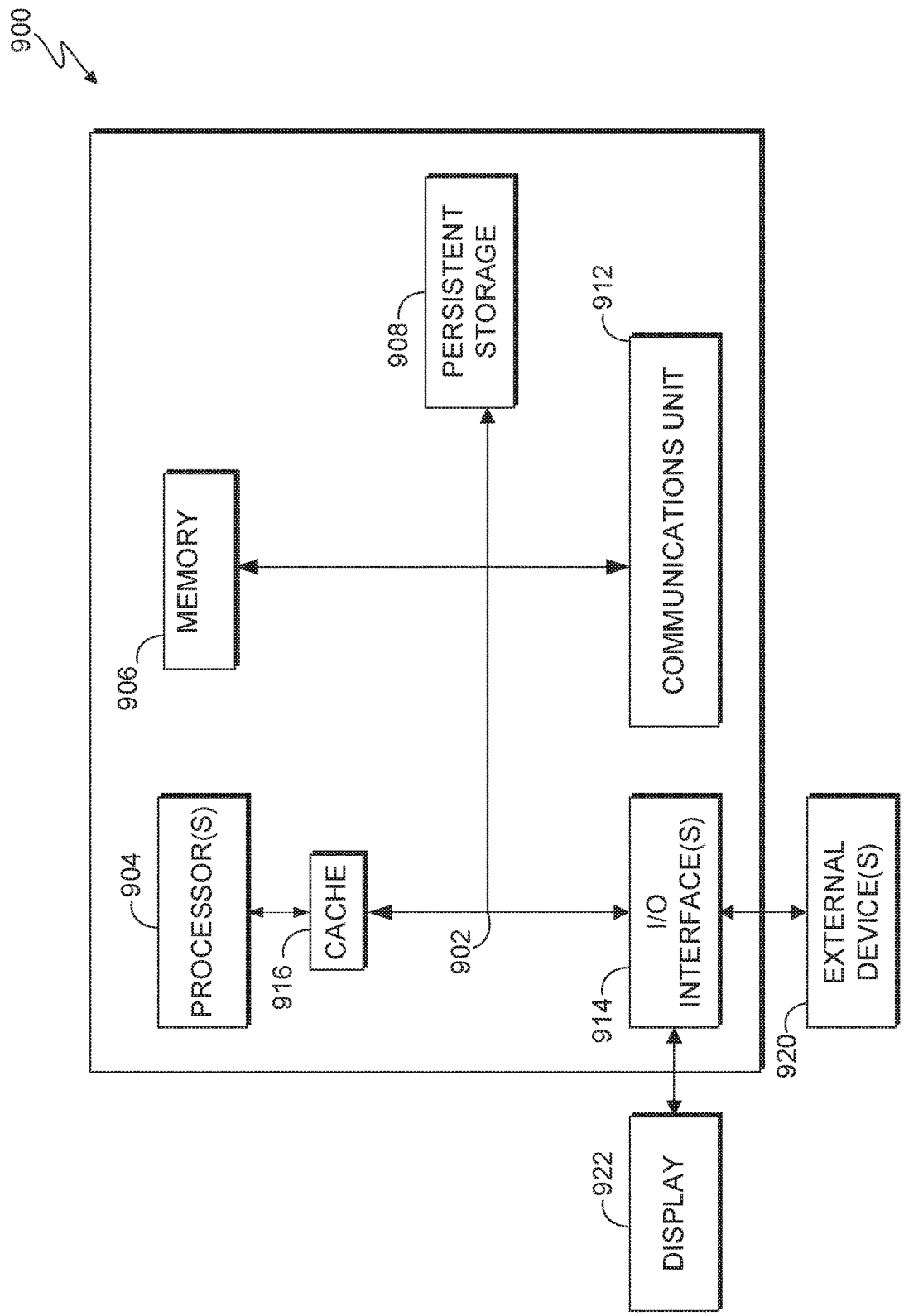
FIG. 9 depicts a block diagram of components of the computing systems of FIG. 1, in accordance with an embodiment of the present invention.

FIG. 9 depicts a block diagram of components of computing systems within computing environment 100 of FIG. 1, in accordance with an embodiment of the present invention. It should be appreciated that FIG. 9 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 900 includes communications fabric 902, which provides communications between cache 916, memory 906, persistent storage 908, communications unit 912, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses or a crossbar switch.

Memory 906 and persistent storage 908 are computer readable storage media. In this embodiment, memory 906 includes random access memory (RAM). In general, memory 906 can include any suitable volatile or non-volatile computer readable storage media. Cache 916 is a fast memory that enhances the performance of computer processor(s) 904 by holding recently accessed data, and data near accessed data, from memory 906.

Timeline program 110 (not shown) may be stored in persistent storage 908 and in memory 906 for execution by one or more of the respective computer processors 904 via cache 916. In an embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. Timeline program 110 may be downloaded to persistent storage 908 through communications unit 912.

I/O interface(s) 912 allows for input and output of data with other devices that may be connected to client computing device and/or server computer. For example, I/O interface 912 may provide a connection to external devices 920 such as a keyboard, keypad, a touch screen, and/or some other suitable input device. External devices 920 can also include portable computer readable storage media such as, for example, thumb drives, portable optical or magnetic disks, and memory cards. Software and data used to practice embodiments of the present invention, e.g., Timeline program 110, can be stored on such portable computer readable storage media and can be loaded onto persistent storage 908 via I/O interface(s) 912. I/O interface(s) 912 also connect to a display 920.

Display 920 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, using machine learning, contextual data associated with event data for an event, the event having an event timeline associated therewith and the event data including multiple digitally-recorded components of real-life imagery depicting one or more aspects of the event along the event timeline, the event being a real-life event;
   determining a level of event significance of the event based on the contextual data associated with the event data for the event, the determined level of event significance being one event significance level of greater than two specified event significance levels;
   based on the determined level of event significance of the event being a highest event significance level of the greater than two specified event significance levels, automatically generating and saving a digital visual representation of the event in the database of events according to the event timeline associated therewith using the multiple digitally-recorded components of the real-life imagery, the generated digital visual representation including one or more objects that are visually part of the event itself, and which a user can interact with when displayed as part of the event itself; and
   integrating the generated digital visual representation of the event into a digital display of one or more digitally-recorded components of real-life imagery of the multiple digitally-recorded components of real-life imagery depicting one or more aspects of the event, the integrating comprising displaying as a digital overlay the visual representation on the digital display, the visual representation being user-selectable on the digital display to recreate the event and associated event timeline, and the user interacting via the digital display with an object of the one or more objects that are visually part of the event itself, and which the user can interact with when displayed as part of the event.

2. The computer-implemented method of claim 1, further comprising:
   recording one or more actions for a configurable time period;
   classifying the one or more recorded actions as the event based on the contextual data;
   identifying objects in the one or more recorded actions to provide the one or more objects that are visually part of the event;
   storing the event in the database of events; and
   continually updating the database of events with live streams.

3. The computer-implemented method of claim 1, wherein determining a level of significance of the event in a database of events based on the contextual data comprises:
   accessing the contextual data from received content;
   generating a score for the event by assigning weight values to objects associated with the event; and
   adding the assigned weight values for the objects associated with the event.

4. The computer-implemented method of claim 3, further comprising:
   in response to the added weight values reaching or exceeding a threshold value, classifying the event as significant.

5. The computer-implemented method of claim 1, wherein determining the level of significance of the event in the database of events based on the contextual data comprises receiving user input classifying the event as significant.

6. The computer-implemented method of claim 1, wherein generating the digital visual representation of the event in the database of events comprises:
   generating one or more graphical icons that, when selected, allow the user to select a time within the event timeline of the event to digitally experience the event.

7. The computer-implemented method of claim 1, wherein integrating the digital visual representation of the event into the digital display comprises:
   overlaying the generated visual representation in a two dimensional or three-dimensional display of a mapping service.

8. A computer program product comprising:
   one or more computer readable storage media and program instructions stored on the one or more computer readable storage media, the program instructions comprising:
      program instructions to determine contextual data associated with event data for an event, the event having an event timeline associated therewith and the event data including multiple digitally-recorded components of real-life imagery depicting one or more aspects of the event along the event timeline, the event being a real-life event;
      program instructions to determine a level of event significance of the event based on contextual data associated with the event data for the event, the determined level of event significance being one event significance level of greater than two specified event significance levels;
      program instructions to, based on the determined level of event significance of the event being a highest event significance level of the greater than two specified event significance levels, automatically generate and save a digital visual representation of the event in the database of events according to the event timeline associated therewith using the multiple digitally-recorded components of real-life imagery, the generated digital visual representation including one or more objects that are visually part of the event itself; and program instructions to integrate the generated digital visual representation of the event into a digital display of one or more digitally-recorded components of real-life imagery of the multiple digitally-recorded components of real-life imagery depicting one or more aspects of the event, the integrating comprising displaying as a digital overlay the visual representation on the digital display, the visual representation being user-selectable on the digital display to recreate the event and associated event timeline, and the user interacting via the digital display with an object of the one or more objects that are visually part of the event itself, and which the user can interact with when displayed as part of the event.

9. The computer program product of claim 8, wherein the program instructions stored on the one or more computer readable storage media further comprise:
program instructions to record one or more actions for a configurable time period;
program instructions to classify the one or more recorded actions as the event based on the contextual data;
program instructions to identify objects in the one or more recorded actions to provide the one or more objects that are visually part of the event;
program instructions to store the event in the database of events; and
program instructions to continually update the database of events with live streams.

10. The computer program product of claim 8, wherein the program instructions to determine a level of significance of the event in a database of events based on the contextual data comprise:
program instructions to access the contextual data from received content;
program instructions to generate a score for the event by assigning weight values to objects associated with the event; and
program instructions to add the assigned weight values for the objects associated with the event.

11. The computer program product of claim 10, wherein the program instructions stored on the one or more computer readable storage media further comprise:
program instructions to, in response to the added weight values reaching or exceeding a threshold value, classify the event as significant.

12. The computer program product of claim 8, wherein the program instructions to determine the level of significance of the event in the database of events based on the contextual data comprise program instructions to receive user input classifying the event as significant.

13. The computer program product of claim 8, wherein the program instructions to generate the digital visual representation of the event in the database of events comprise:
program instructions to generate one or more graphical icons that, when selected, allow the user to select a time within the event timeline of the event to digitally experience the event.

14. The computer program product of claim 8, wherein the program instructions to integrate the digital visual representation of the event into the digital display comprise:
program instructions to overlay the generated visual representation in a two dimensional or three-dimensional display of a mapping service.

15. A computer system comprising:
one or more computer processors;
one or more computer readable storage media; and
program instructions stored on the one or more computer readable storage media for execution by at least one of the one or more computer processors, the program instructions comprising:
program instructions to determine contextual data associated with event data for an event, the event having an event timeline associated therewith and the event data including multiple digitally-recorded components of real-life imagery depicting one or more aspects of the event along the event timeline, the event being a real-life event;
program instructions to determine a level of event significance of the event based on contextual data associated with the event data for the event, the determined level of event significance being one event significance level of greater than two specified event significance levels;
program instructions to, based on the determined level of event significance of the event being a highest event significance level of the greater than two specified event significance levels, automatically generate and save a digital visual representation of the event in the database of events according to the event timeline associated therewith using the multiple digitally-recorded components of real-life imagery, the generated digital visual representation including one or more objects that are visually part of the event itself; and
program instructions to integrate the generated digital visual representation of the event into a digital display of one or more digitally-recorded components of real-life imagery of the multiple digitally-recorded components of real-life imagery depicting one or more aspects of the event, the integrating comprising displaying as a digital overlay the visual representation on the digital display, the visual representation being user-selectable on the digital display to recreate the event and associated event timeline, and the user interacting via the digital display with an object of the one or more objects that are visually part of the event itself, and which the user can interact with when displayed as part of the event.

16. The computer system of claim 15, wherein the program instructions stored on the one or more computer readable storage media further comprise:
program instructions to record one or more actions for a configurable time period;
program instructions to classify the one or more recorded actions as the event based on the contextual data;
program instructions to identify objects in the one or more recorded actions to provide the one or more objects that are visually part of the event;
program instructions to store the event in the database of events; and
program instructions to continually update the database of events with live streams.

17. The computer system of claim 15, wherein the program instructions to determine the level of significance of the event in the database of events based on the contextual data comprise:
program instructions to access the contextual data from received content;
program instructions to generate a score for the event by assigning weight values to objects associated with the event; and
program instructions to add the assigned weight values for the objects associated with the event.

18. The computer system of claim 17, wherein the program instructions stored on the one or more computer readable storage media further comprise:

program instructions to, in response to the added weight values reaching or exceeding a threshold value, classify the event as significant.

19. The computer system of claim 15, wherein the program instructions to determine the level of significance of the event in the database of events based on the contextual data comprise program instructions to receive user input classifying the event as significant.

20. The computer system of claim 15, wherein the program instructions to generate the digital visual representation of the event in the database of events comprise:

program instructions to generate one or more graphical icons that, when selected, allow the user to select a time within the event timeline of the event to digitally experience the event.

* * * * *